(No Model.)　　　　　　　　　　E. CLIFF.　　　　　　　2 Sheets—Sheet 1.
CAR BRAKE.
No. 525,533.　　　　　　　　　　　　　　　Patented Sept. 4, 1894.
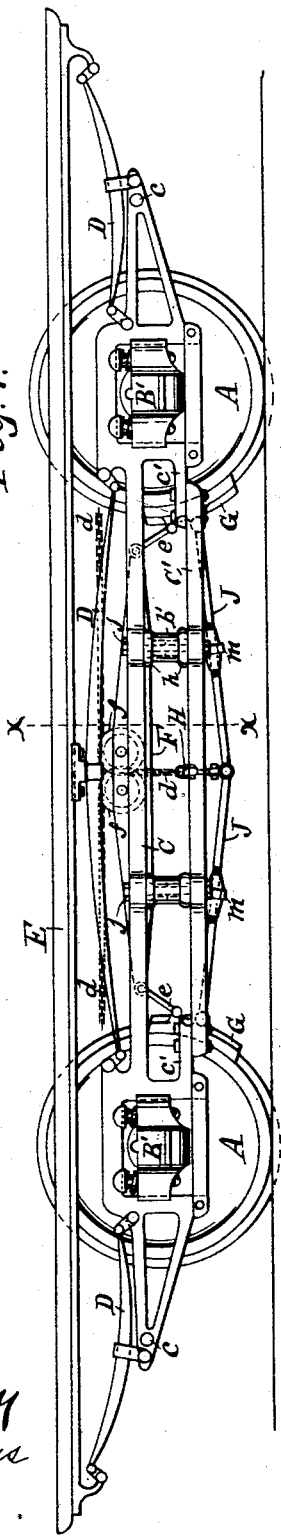
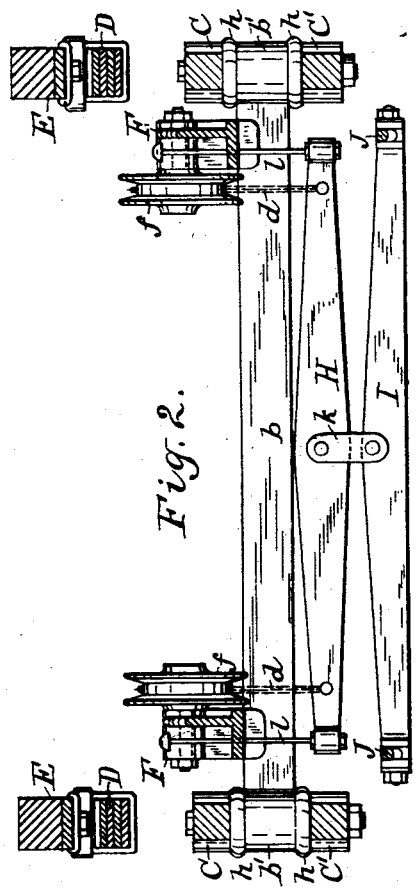
Witnesses:
Mark W. Dewey
H. M. Seamans
Inventor,
Edward Cliff.
By C. H. Duell
his Attorney.

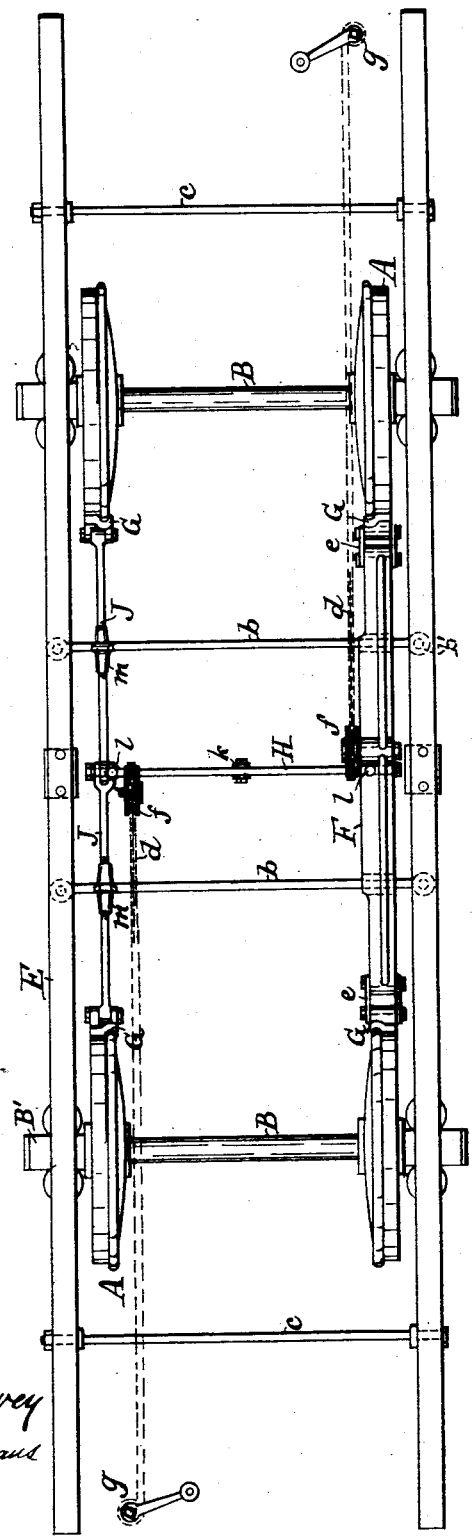

UNITED STATES PATENT OFFICE.

EDWARD CLIFF, OF NEWARK, NEW JERSEY.

CAR-BRAKE.

SPECIFICATION forming part of Letters Patent No. 525,533, dated September 4, 1894.

Application filed April 2, 1894. Serial No. 506,010. (No model.)

*To all whom it may concern:*

Be it known that I, EDWARD CLIFF, of Newark, in the county of Essex, in the State of New Jersey, have invented new and useful Improvements in Car-Brakes, of which the following, taken in connection with the accompanying drawings, is a full, clear, and exact description.

My invention relates to car-brakes, particularly brakes for street cars, and the object is to provide a brake of great strength that can be easily and quickly applied to the wheels, and that will bear upon each of the wheels with equal pressure and with equal strain on both ends of the car.

To this end my invention consists in the combination with the frame and wheels of a car truck, of a brake beam lever, a brake beam, a pair of toggle arms pivoted to each end of the brake beam, a brake-shoe on the end of each of said toggle arms, and suitable means at each end of the car to raise the brake beam to apply the shoes to the wheels. And my invention consists in certain other combinations of parts hereinafter described and specifically set forth in the claims.

In the drawings, Figure 1 is a side elevation of a car-truck provided with my improved braking mechanism. Fig. 2 is an enlarged sectional view of the said truck and braking mechanism taken on line $x, x$, of Fig. 1, looking from right to left of the figure, and Fig. 3 is a top plan view of Fig. 1.

Referring specifically to the drawings, A are the wheels, B the axles and B' the axle boxes of the truck.

C is the lower frame of the truck consisting of sides joined together by bolts, c, passing therethrough, one at each end and cross-bars, b, near, and on each side of the center, connected preferably yieldingly with the said sides.

The movable or upper frame, E, upon which the car body rests is mounted upon springs, D, placed between the two frames.

The cross-bars, b, may be rigid or they may be provided at their ends as shown with eyes, b', which extend and lie between the horizontal parallel bars of the lower frame C. The said eyes are cushioned by rings or washers, h, of rubber placed above and below the eyes and entering therein, or, between the said eyes and the parallel bars. Bolts, j, extend vertically through the said bars, eyes, b', and rings, h, to secure the parts together. The rubber washers or cushions provide yielding bearings for the said cross-bars.

Each side of the lower frame may be made in one piece if desired, but I prefer to make the lower bar C' removable so that the cross-bars, b, may be more easily inserted and removed from the frame.

When the lower bar C' is adapted to be removed it is bolted as shown to the lower sides of arms, c', projecting inwardly from the saddles which are shown integral with the sides of the frame.

Extending longitudinally of the truck, on each side thereof, in line with the wheels, and lying upon said cross-bars, b, is a beam F. These beams extend nearly to the wheels and are provided at their ends with links or short pivoted bars, e, depending therefrom and supporting the brake-shoes G in position to swing toward and from the wheels when operated. The said shoes are arranged to bear upon the inner sides of the wheels.

Suspended crosswise of the truck in the center or midway between the axles of the wheels A is the break beam lever H.

The lever H is suspended from the beams, F, by chains, d, connected one at each end of the lever and passing upward and in opposite directions over small wheels or pulleys f pivoted on the inner sides of the beams F. These chains have their opposite ends connected to the brake shafts, g, at each end of the car. When either chain is wound upon the shaft, the other chain becomes the fulcrum of the brake-beam lever, H, causing equal strain to come upon each chain as will be hereinafter clearly shown. In order, however, to prevent the said lever and brake-beam from falling should one of the brake-chains become broken, I provide a safety-chain or bolt, l, at each end of the lever H, which passes vertically from the lever upward and through one of the beams F. Each of these bolts are secured firmly to the lever, H. The bolt passes loosely through the beam, F, so that it will not interfere with the operation of the braking mechanism, or the raising and lowering of the brake-lever. When the mechanism is in its normal or inoperative position the heads on the upper ends of the bolts are somewhat above the beams, F, and do not come in contact with the beams unless one of the chains is broken.

Directly below the lever, H, and extending in the same direction is the brake beam, I, which is pivoted or hung at its center, by suitable means, from the said lever. I have shown the beam suspended from the center of the lever by plates, $k$, one on each side of the brake beam and lever and a bolt passing through each of the parts and the said plates. The said brake beam lies below the axles, B, and the toggle arms, J, pivoted to its ends incline upwardly in opposite directions from the brake-beam to the brake-shoes to which the said arms are pivoted. The toggle arms are pivoted to the shoes below the links or short pivoted bars $e$.

I preferably form each of the toggle-arms in two pieces with right and left thread and a nut, $m$, between and engaging with the thread on the pieces to lengthen or separate the pieces of the arms to allow for wear upon the brake-shoes, so that the proper tension may be kept uniform without increasing the movement of the brake-chain.

The small wheels or pulleys, $f$, have their axles in the same horizontal plane but are not in line with each other although parallel. This is for the purpose of passing the chains vertically from the brake-beam to the wheels and then passing them in opposite directions.

The operation of the braking mechanism is as follows: When either chain is drawn toward an end of the car by the brake shaft or other suitable and well known operating means, the end of the brake lever to which the chain is attached is raised with the brake-beam, and this beam being pivoted to the lever, H, at its center, it will be apparent that an equal strain will be placed upon the other chain. As the brake-beam is raised the inner ends of the toggle arms are drawn upward and forced toward a horizontal position which in turn forces the shoes, G, against the peripheries of the wheels, A, with equal pressure. When the brake-shaft, $g$, is released the beam drops with the toggle arms drawing the brake shoes away from the wheels. The cross-bars being mounted yieldingly on the frame prevents breaking of the chains or other parts which might otherwise occur, especially if the wheels were worn unevenly or the brake applied too tightly.

Any matters shown or described herein but not claimed are not dedicated to the public but form the subject matter of another application, Serial No. 504,902, filed March 24, 1894.

Having described my invention, what I claim as new, and desire to secure by Letters Patent, is—

1. In a car-brake, the combination with the frame and the wheels of a car-truck, of a brake-beam, a pair of toggle-arms pivoted to each end of the brake beam, a brake-shoe on the end of each of the said toggle-arms, and suitable means at each end of the car to raise the brake beam to apply the shoes to the wheels, substantially as described.

2. In a car-brake, the combination with the frame and the wheels of a car-truck, of a brake-beam, a pair of toggle-arms pivoted to each end of the brake beam, a brake shoe on the end of each of the said toggle arms, a brake-beam lever pivoted to the center of the brake-beam, and suitable operating means at each end of the car connected to the brake lever, substantially as described.

3. In a car-brake, the combination with the frame and the wheels of a car-truck, of a brake-beam, a pair of toggle-arms pivoted to each end of the brake-beam, a brake shoe on the end of each of the said toggle-arms, a brake-beam lever pivoted to the center of the brake-beam, pulleys pivoted to the truck frame, and connections passing from the ends of the brake-beam lever over the pulleys to the opposite ends of the car, substantially as described.

4. In a car-brake, the combination with the frame and the wheels of a car-truck, of a brake-beam, a pair of toggle-arms pivoted to each end of the brake-beam, each toggle-arm being divided and provided with right and left thread, a nut connecting the parts and engaging the thread, a brake-shoe on the end of each of the said toggle arms, and suitable means at each end of the car to raise the brake beam to apply the shoes to the wheels, substantially as described.

5. In a car-brake, the combination with the frame and the wheels of a car-truck, of a brake-beam, a pair of toggle-arms pivoted to each end of the brake-beam, a brake-shoe on the end of each of the said toggle-arms, a brake-beam lever pivoted to the center of the brake-beam, pulleys pivoted to the truck-frame, cushions between parts of the truck-frame, and connections passing from the ends of the brake-beam lever over the pulleys and to opposite ends of the car, substantially as described.

6. In a car-brake, the combination with the frame and the wheels of a car truck, of a brake-beam, a pair of toggle-arms pivoted to each end of the brake-beam, a brake shoe on the end of each of the said toggle arms, a brake-beam lever pivoted to the center of the brake-beam, cross-bars, cushions between the cross-bars and the sides of the frame, beams secured to the cross-bars, pulleys pivoted on the beams, and connections leading from the said lever over the pulleys toward each end of the car, substantially as described.

7. In a car-brake, the combination with the frame, and the wheels and axles of a car-truck, of cross-bars extending between the sides of the frame, flexible material between the ends of the cross-bars and the frame, beams supported upon the cross-bars, brake-shoes suspended from the ends of the said beams, wheels pivoted near the center of the said beams, a brake-beam and lever linked together at their centers, connections leading from the ends of the lever over the pulleys toward both ends of the car, bolts extending vertically upward from the said lever through the beams, toggle-arms pivoted to the ends of the brake-beam and to the said shoes, and means to raise the brake-beam through the said connections, substantially as shown and described.

8. In a car-brake, the combination with the frame, and the wheels and axles of a car-truck, of cross-bars extending between the sides of the frame, flexible material between the ends of the cross-bars and the frame, beams supported upon the cross-bars, brake-shoes suspended from the ends of the said beams, wheels pivoted near the center of the said beams, a brake beam and lever linked together at their centers, connections leading from the ends of the lever over the pulleys toward both ends of the car, connections between the ends of the lever and the beams, toggle arms pivoted to the ends of the brake-beam and to the said shoes, means whereby the said arms may be varied in length, and suitable means whereby the brake beam may be raised through the connections to force the shoes against the wheels, as set forth.

In testimony whereof I have hereunto signed my name.

EDWARD CLIFF.

Witnesses:
VICTOR J. GOETZ,
W. H. GRAHAM.